Figure 1:
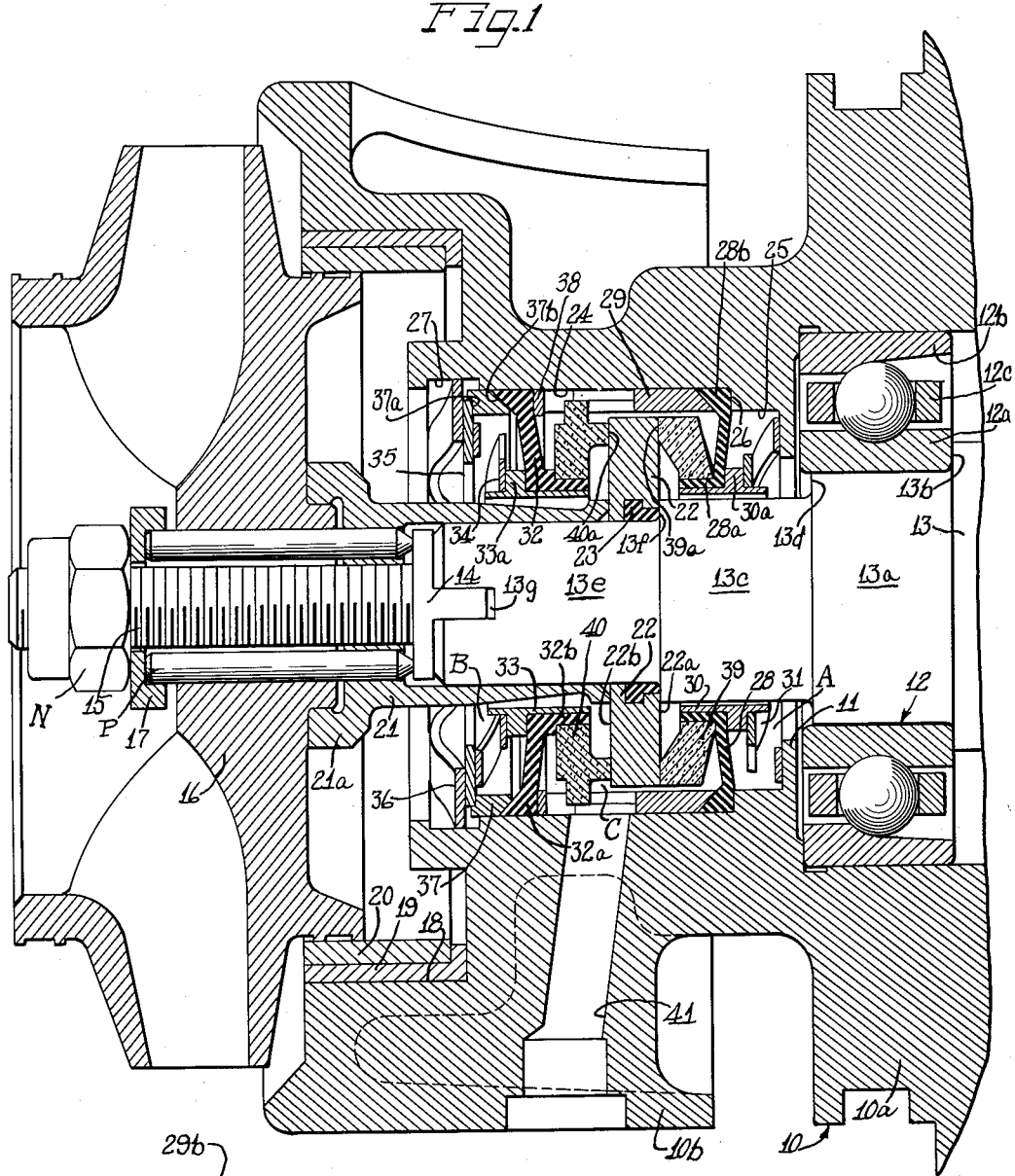

June 5, 1956  R. CLIBORN  2,749,156
SEAL
Filed April 18, 1952

Inventor:
Robert Cliborn
by Kief, Thurman, Means, Cross & Simpson Attys

United States Patent Office 2,749,156
Patented June 5, 1956

2,749,156

SEAL

Robert Cliborn, Euclid, Ohio, assignor to Thompson Products, Inc., Cleveland, Ohio, a corporation of Ohio Application April 18, 1952, Serial No. 283,098

5 Claims. (Cl. 286—11)

This invention relates generally to a mechanical face type shaft seal and more particularly to a built-in type shaft seal including a double seal arrangement cooperable with a rotatable shaft ring and having a drain between the double seals with the drain hole extending through the shaft housing.

According to the general features of the present invention, a built-in shaft seal arrangement is provided for a high speed shaft rotatably mounted on bearings in a hollow casing or housing. In contrast to a cartridge unit wherein the sealing means are set in a cartridge which must be fitted in the housing, the instant invention provides a built-in type seal arrangement wherein the cooperating parts are mounted on the housing and the shaft without the necessity of first assembling a cartridge casing.

A sleeve and a hard metal shaft ring are adapted to be co-rotatably mounted in axial alignment on the rotatable shaft with the hollow housing generally surrounding the shaft ring and with the sleeve clampingly retaining the shaft ring on the shaft by urging the same against an annular shoulder on the shaft. The housing is generally cup-shaped and has at its open end an annular groove adapted to receive a ring snap which resiliency urges the entire assembly against the closed end of the housing. A pair of flexible sleeve type diaphragms are mechanically clamped against the housing and the free end of each is seated on a retainer ring constructed to engage a resilient member for biasing the retainer ring toward the shaft ring.

One of the features of the present seal arrangement lies in the arrangement of the resilient members whereby the seal volume can automatically compensate for either shrinkage or swelling in the diaphragm materials due to drying action or the action of aromatic fuels upon the diaphragm materials.

Another feature lies in the suitability of the instant seal arrangement to automatically compensate for adverse tolerance and stack-ups in some of the component parts. This feature is particularly advantageous in the case of seal arrangements involving the use of a small amount of space.

Still another feature of the instant invention lies in the provision of a minimum number of parts and types of material for use in the instant seal arrangement, thereby greatly simplifying the problems of assembly, eliminating potential leakage points and reducing the tendency toward destructive corrosive action. Also, since the instant seal assembly is a built-in assembly, as contrasted to a cartridge assembly, the checking of the operativeness of the individual parts may be definitely ascertained at the time of assembly of the seal arrangement on the shaft.

It is therefore an important object of the instant invention to provide an improved built-in type shaft seal arrangement of simplified, self-compensating construction.

It is a further object of the instant invention to provide a shaft seal for a rotatable shaft extending through a bearing housing, comprising shaft ring means adapted to be mounted on the rotatable shaft for co-rotation therewith and having opposed radially extending sealing faces, non-rotatable seal ring means resiliently urged into sealing engagement with said housing and engaging said opposed sealing faces of said shaft ring means, thereby to establish a pair of axially spaced isolated chambers in said housing and a venting chamber between said seal ring means, and means defining a venting passageway extending through said housing.

It is another object of the instant invention to provide an improved sealing arrangement for a high speed shaft comprising a housing, bearing means rotatably mounted in said housing and mounting a shaft extending outwardly of said housing, a seal ring in said housing rotatably mounted on said shaft and having opposed radial seal faces, a double seal barrier comprising a pair of flexible sleeve like diaphragms in said housing on opposite sides of said seal ring, means sealingly engaging one end of each of said diaphragms with said housing, a stationary seal ring carried by the other end of each of said diaphragms and arranged to engage said opposed seal faces on said seal ring, resilient means for loading each of said diaphragms and the stationary seal rings carried thereby into engagement with said seal ring, and means defining a venting passageway in communication with that portion of the housing lying between the diaphragms.

Many other advantages, features and additional objects of the present invention will become manifest to those versed in the art upon making reference to the detailed description which follows and the accompanying sheet of drawings in which a preferred embodiment of a seal constructed in accordance with the principles of the present invention is shown.

Figure 2:
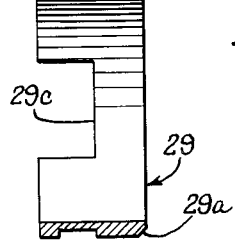

On the drawings:

Figure 1 is a cross-sectional view with parts in elevation of a typical bearing housing element having a shaft mounted therein with a built-in seal according to the present invention surrounding the shaft in the housing; and Figure 2 is a cross-sectional side elevational view of a spacer in the assembly of Figure 1.

As shown on the drawings:

Although not limited thereto, the shaft seal constructed in accordance with the principles of the present invention finds a particular utility when employed in connection with a high speed fuel pump or a water-alcohol pump driven by an air turbine or other suitable prime mover, the speed of rotation of the shaft with which the seal is associated approaching velocities as high as 35,000 R. P. M. It will be understood, however, that the sealing structure described and claimed can be effectively used wherever it is necessary to double seal a housing mounting a rotatable shaft.

In Figure 1, a housing is indicated generally by the reference numeral 10 and includes a bearing housing portion 10a and an adjacent shaft seal housing 10b, which is separated from the bearing housing 10a by a bearing housing wall 11, which is an inwardly turned annular ledge imparting a cup-shape to the sealing housing portion 10b.

In the bearing housing 10a, bearing means 12 including an inner race 12a, an outer race 12b and shiftable elements 12c therebetween are mounted adjacent to the bearing housing wall 11, so as to rotatably receive the protrusion of a shaft 13. In the particular embodiment shown in Figure 1, the shaft 13 is stepped down, there being a first reduced diameter portion 13a which cooperates with a first annular shoulder 13b to receive the inner race 12a of the bearing means 12, there also being a second reduced diameter shaft portion 13c extending away from the first reduced diameter portion 13a with a shoulder 13d therebetween and a third reduced diameter portion 13e extending away from the second reduced diameter portion 13c with a shoulder 13f formed therebetween. The end of the third reduced diameter portion 13e is castellated to provide a plurality of keyways 13g in the end face thereof.

The keyways 13g cooperatively receive a key member 14. A threaded stud 15 extends, axially, through the impeller body 16, the key 14 and into threaded engagement in the shaft portion 13e. A nut N threadedly engaging the stud 15 engagingly abuts an annular collar 17 mounted on the stud 15 and mounting pins P which extend through the impeller body 16 to engage the back surface of the key 14, so that rotation of the nut N may effect axial movement of the collar 17, the pins P against the key 14, and the engagement between the pins P and the key 14 effectively engages the impeller body 16 for co-rotation with the shaft 13.

It will be noted that the seal housing 10b is provided with an annular groove 18 concentrically disposed relative to the shaft 13 and arranged to receive in pressed relationship therewith a suitable metal wearing ring 19 which cooperates with an axially extending annular rib 20 mounted on the impeller body 16 and arranged in concentric close running clearance relationship.

Turning now to the details of the construction of the seal arrangement in the seal housing portion 10b, it will be noted that a sleeve 21 telescopes over the third reduced diameter portion 13e of the shaft 13 and one end engagingly abuts a shaft ring 22 to mechanically lock the shaft ring 22 against the shoulder 13f on the shaft 13 for co-rotation therewith. The resilient annular (rubber) liner 23 mounted at the inner periphery of the ring 22 functions as a seal, the locking engagement of the sleeve 21 being sufficient to mount the ring 22 on the shaft 13 for co-rotation. The other end of the sleeve 21 is suitably apertured to pass the pins P and mounts integral shoulder portions 21a which abuttingly engage the impeller body 16. The shaft ring 22 is preferably lapped on both radial faces so as to provide a first seal face 22a and a second seal face 22b.

It will be noted from Figure 1 that the seal housing portion 10b of the housing 10 includes a generally cylindrical cup shaped aperture defined by the bearing housing walls 11 and the inner cylindrical walls of the housing portion 10b which surround the second and third reduced diameter portions 13c and 13e of the shaft 13 and the shaft ring 22 mounted therebetween. Actually, the cylindrical walls of the housing portion 10b include a stepped bore defining a first enlarged recess 24 and a reduced diameter recess 25 adjacent the bearing housing walls 11, there being an annular shoulder 26 therebetween. Also, there is an annular groove 27 adjacent the open end of the housing portion 10b.

A flexible sleeve-type diaphragm 28 made of a suitable elastic material (e. g. rubber) is provided with an inner annular flanged end portion 28a and an axially extending central portion terminating with a tapered peripheral bead 28b arranged to engage the wall portion 24 of the housing 10 at the shoulder 26. The diaphragm 28 is retained in firm assembly within the housing 10 mechanically, for example, by means of an annular metal band or spacer 29. It will be noted that the spacer 29 has a beveled edge 29a (Figure 2) forming an annular mating surface for the tapered bead portion 28b of the diaphragm 28.

As will be explained hereinafter, the spacer 29 is urged resiliently in the direction of the bearing means 12, so that in its cooperation with the tapered bead 28b mechanical locking against the shoulder 26 is accomplished as well as sealing engagement against both the wall 24 and the shoulder 26. It will also be noted that the tapering of the bead portion 28b, being directed away from the bearing means 12, and toward the source of the resilient force (to be described hereinafter) cooperates with the spacer 29 and the walls 24 and shoulder 26 so as to constantly maintain the sealing and locking engagement between, notwithstanding, swelling or shrinking of the bead portion 28b (or the entire diaphragm 28) which might take place as a result of action by liquids or other materials which might come in contact with the resilient diaphragm 28.

A metal ferrule or retainer ring 30 is provided to snugly receive the inner annular flanged end portion 28a of the diaphragm 28, the retainer ring 30 being provided with a flared flange portion 30a which is arranged to bottom one end of a resilient clip or spring member 31, having its opposite end engaging the closed end portion of the housing 10b, which end portion is formed by the bearing housing wall 11. The retainer ring 30 is thereby normally biased, together with the end 28a of the diaphragm 28 in an axial direction. It will be noted that the retainer ring 30 is slightly larger than the shaft portion 13c which it surrounds, so that the retainer ring 30 may be stationary while the shaft 13 rotates.

The other side of the shaft ring 22 has a somewhat similar seal diaphragm arrangement. A second flexible sleeve-type diaphragm 32 made of suitable elastic material engages the wall portion 24 of the housing 10 at the outer peripheral tapered bead portion 32a thereof and has an inner annular flange portion 32b which is snugly received by a second metal retainer ring 33. Like the retainer ring 30, the second retainer ring 33 is slightly larger than the rotatable shaft portion 13e (and the rotatable sleeve 21 telescoped thereupon), so that the retainer ring 33 may remain stationary during rotation of the rotatable parts which it surrounds. Also, the retainer ring 33 is provided with a flared flange portion 33a which is arranged to bottom one end of a second resilient clip or spring member 34 having its opposite end engaging a backing ring 35, thereby to normally bias the retainer ring 33 together with the flanged end 32b of the diaphragm sleeve 32 in an axial direction.

A resilient ring snap 36 is removably mounted in the annular groove 27 of the housing portion 10b, and the ring snap 36 engages the backing ring 35 and normally biases the backing ring axially in the direction of the bearing means 12. The backing ring 35, in turn, seats in an annular shoulder 37a of a press ring 37 lying close to the housing wall 24. The press ring 37 has an annular beveled face 37b (opposite the annular shoulder portion 37a) which matingly engages the tapered bead portion 32a of the second diaphragm 32. Again, the tapered side of the tapered bead 32 extends away from the bearing means 12 and in the direction of the source of resilient force (which is the ring snap 36) for the reasons hereinbefore described.

A second press ring 38 is provided behind the bead portion 32a opposite the first press ring 37, so as to back the diaphragm bead portion 32a, and the second press ring 38 is, in turn, backed by the end of the spacer 29 opposite the beveled edge 29a thereof. It will thus be seen that the resilient ring snap 36 acting through the backing ring 35, the first press ring 37, the diaphragm bead portion 32a, the second press ring 38, and the spacer 29 resiliently urges the bead portion 28b of the first diaphragm 28 into sealing and locking engagement. Also, the ring snap 36 acting through the backing ring 35 and the first press ring 37 urges the second diaphragm bead portion 32a, into sealing and locking engagement against the wall portion 24 and against the second press ring 38, which in turn is backed by the spacer 29 and the resilient bead portion 28b of the first diaphragm 28.

It will also be appreciated that by first removing the impeller 16 and the sleeve 21, the ring snap 36, which retains all of the remaining parts of the seal assembly, may be removed so as to remove and replace any of the various parts of the seal assembly.

Referring now to the cooperation of the parts at the first and second seal faces 22a and 22b of the seal ring 22, it will be seen that a pair of non-rotatable seal rings 39 and 40, respectively, preferably made of a softer material than the shaft ring 22, for example, carbon or the like are supported by the diaphragms 28 and 32, respectively. The annular seal ring 39 is snugly and sealingly pinched upon the inner flange portion 28a of the first diaphragm 28, thereby snugly sandwiching the flange portion 28a between the seal ring 39 and the retainer ring 30. In like manner, the seal ring 40 snugly sandwiches the inner flange portion 32b of the diaphragm 32 between itself and the second retainer ring 33, so as to effect sealing engagement between the seal ring 40 and the second diaphragm 32. Each of the non-rotatable seal rings 39 and 40 is provided with an axially extending annular face portion 39a and 40a, respectively, constituting bearing surfaces for sealingly engaging the respective sealing faces 22a and 22b of the shaft ring 22. Since the seal rings 39 and 40 are preloaded by the opposed resilient members 31 and 34, as well as the ring snap 36, and are floatingly supported by the flexible diaphragms 28 and 32, the non-rotatable seal rings 39 and 40 will run square on the shaft ring 22 and together with the shaft ring 22, as well as the housing portion 10b, will establish a first chamber A, a second chamber B and a medial venting chamber C.

Referring now to Figure 2, it will be seen that the spacer 29 has an outer peripheral groove 29b and one or more slots or openings 29c affording communication between the groove 29b and the inside of the spacer 29. Actually, the chamber C is defined by the diaphragms 28 and 32, the seal rings 39 and 40, the shaft ring 22 and the spacer 29, and the openings 29c in cooperation with the peripheral groove 29b in the spacer 29 afford a means of communication from the chamber C to the passageway 41 which, in turn, extends through the housing portion 10b to the atmosphere. It will thus be seen that means are provided defining a venting passageway 41 which extends through the housing 10 and lies in registry with a venting passageway defined by the openings 29c and the groove 29b in the spacer 29, thereby to establish venting communication between the medial chamber C and the atmosphere. Thus, if fuel leaks from the chamber B into the venting chamber C, it will be vented to the atmosphere through the aperture 41; and if oil or another lubricant leaks from the chamber A into the venting chamber C, it will be vented to the atmosphere through the aperture 41.

Although I referred to detail in describing the structural features of the preferred embodiment of my invention, it should be understood that I wish to embody within the scope of this patent all such modifications as reasonably and properly come within the scope of my contribution to the art.

In addition, I should like to point out that a cartridge type seal assembly embodying diaphragm and seal arrangements comparable to the instant seal arrangement is described and claimed in my copending application Serial No. 188,424, filed October 4, 1950, now U. S. Patent 2,662,480 issued December 15, 1953.

I claim as my invention:

1. A built-in type shaft seal comprising, in combination, a sleeve and a shaft ring adapted to be co-rotatably mounted in axial alignment on a rotatable shaft having an annular shoulder thereon, said shaft ring being clamped to said annular shoulder by said sleeve, a resilient inner ring mounted on said shaft ring for sealingly engaging said shaft, a cup-shaped housing having a generally cylindrical wall portion forming a plurality of stepped counterbores progressively increasing in diameter toward the open end of the housing arranged around said shaft in the locale of said shaft ring, a first resilient means having one end engaging the closed end of the housing and arranged to encircle said shaft, a first retainer ring seating the other end of said first resilient means, a first flexible diaphragm sleeve having one end snugly seated on said first retainer ring and the other end engaging said wall portion of said housing and shouldered against a first annular abutment formed between said stepped counterbores, said other end of said diaphragm sleeve having a tapered bead thereon, an annular spacer having a beveled edge matingly engaging said other end of said first diaphragm sleeve and wedge locking the same outwardly against said housing, a first annular seal ring encircling said one end of said first diaphragm sleeve and having an axially extending face arranged to engage one radial face of said shaft ring under the bias of said first resilient means, a second retainer ring, a second flexible diaphragm sleeve having one end snugly seated on said second retainer ring and the other end having a tapered bead thereon and engaging said wall portion of said housing, a first press ring between said spacer and said other end of said second diaphragm sleeve, a second press ring having a beveled edge matingly engaging said other end of said second diaphragm sleeve, opposite the first press ring, a backing ring engaging said second press ring, a second resilient means mounted in an annular groove adjacent the open end of said housing and biasing said backing ring to effect mechanical locking of said other end of said second flexible diaphragm sleeve between said first and second press rings, a third resilient means having one end engaging said backing ring and the other end being seated against said second retainer ring, and a second annular seal ring encircling said one end of said second diaphragm sleeve and having an axially extending face arranged to engage the other radial face of said shaft ring under the bias of said third resilient means.

2. A ring snap-held built-in shaft seal for a high speed shaft rotatably mounted in a housing having a generally cylindrical wall extending outwardly from a housing wall and surroundingly of a shaft portion, comprising a removable resilient ring snap mounted in an annular groove at the outward end of the cylindrical wall, a backing ring biased inwardly by said ring snap, a first resilient means having one end engaging said backing ring, a first retainer ring seating the other end of said first resilient means, a first flexible diaphragm sleeve having one end snugly seated on said first retainer ring and the other end engaging said cylindrical wall of said housing, a first annular seal ring encircling said one end of said first diaphragm sleeve and having an axially extending face, a sleeve and a shaft ring adapted to be co-rotatably mounted in axial alignment on the rotatable shaft portion, said shaft ring being clamped against an annular shoulder on said shaft portion by said sleeve and presenting one radial face to engage the axially extending seal ring face under the bias of said first resilient means, a second resilient means having one end engaging the housing wall, a second retainer ring seating the other end of said second resilient means, a second flexible diaphragm sleeve having one end snugly seated on said second retainer ring and the other end engaging the cylindrical wall of the housing and shouldered against an annular abutment thereon, a second annular seal ring encircling said one and of said second diaphragm sleeve and having an axially extending face arranged to engage the other radial face of said shaft ring under the bias of said second resilient means, annular spacing means adjacent said cylindrical wall between and engaging said other ends of said first and second diaphragm sleeves, and a press ring engaging said backing ring and biased by said ring snap into locking engagement against said other end of said first diaphragm sleeve to bias both of said other ends of said first and second diaphragm sleeves into mechanically locked engagement against said cylindrical wall.

3. A sealing arrangement for a high speed shaft comprising a housing, a shaft extending outwardly of the housing, a seal ring in said housing rotatably mounted on said shaft and having opposed radial seal faces, a double seal barrier comprising a pair of flexible sleeve-like diaphragms in said housing on opposite sides of said seal ring, a stationary seal ring carried by one end of each of said diaphragms and arranged to engage said opposed seal faces on said seal ring, resilient means for loading each of said diaphragms and the stationary seal rings carried thereby into engagement with said rotatable seal ring, a ring snap mounted in an annular groove in said housing and resiliently backing one of said resilient means to bias the same in loading direction, spacer means between and engaging the other ends of said diaphragms and a press ring member adjacent the other end of one of said diaphragms and loaded by said ring snap to effect sealing engagement of the other ends of both said diaphragms with said housing while compensating for shrinkage and swelling of said diaphragms.

4. A sealing arrangement for a high speed shaft comprising a housing, a shaft extending outwardly of said housing, a seal ring in said housing rotatably mounted on said shaft and having opposed radial seal faces, a double seal barrier comprising a first and a second flexible sleeve-like diaphragm in said housing on opposite sides of said rotatable seal ring, a first stationary seal ring carried by the first diaphragm and arranged to engage one of said opposed seal faces on said rotatable seal ring, a first resilient means for loading the first diaphragm and the first stationary seal ring carried thereby into engagement with one of the seal faces of said rotatable seal ring, a removable resilient ring snap mounted in an annular groove in the housing, a backing ring biased inwardly by said ring snap, a second resilient means having one end engaging said backing ring, a retainer ring seating the other end of said second resilient means, the second diaphragm having one end snugly seated on said retainer ring and the other end engaging an adjoining portion of said housing, a second stationary seal ring encircling said one end of the second diaphragm and having an axially extending face for engaging the other of the seal faces of said rotatable seal ring under the bias of said second resilient means, spacer means between the ends of said diaphragms adjacent adjoining portions of the housing, and a press ring engaging the second diaphragm and biased by engagement with said backing ring to mechanically lock both diaphragms against the housing.

5. A sealing arrangement for a high speed shaft journalled in a housing comprising, a rotatable sealing member having opposed radially extending sealing faces, flexible diaphragm members on opposite sides of said sealing member and each having an inner edge carrying a seal ring member for engaging a corresponding one of said sealing faces and each having a radially outwardly spaced outer edge, means in said housing providing a recess around said sealing member and said flexible diaphragm members, separate, oppositely directed, longitudinally acting resilient means in said recess loading said seal ring members against said sealing faces, and ring means at said outer edges of said diaphragm members, a resilient means directing a longitudinally acting biasing force against said ring means and said outer edges clamping said outer edges in firm assembly with adjoining portions of said housing while accommodating shrinkage and swelling of said diaphragm members, said ring means and said outer edges providing coacting wedge portions to force said outer edges of said diaphragm members radially outwardly into sealed engagement with said portions of said housing.

References Cited in the file of this patent

UNITED STATES PATENTS

| | | |
|---|---|---|
| 2,003,003 | Marbury | May 28, 1935 |
| 2,308,114 | Schjolin | Jan. 12, 1943 |
| 2,404,610 | Abell | July 23, 1946 |
| 2,445,018 | Brady | July 13, 1948 |
| 2,509,973 | Holmes | May 30, 1950 |
| 2,538,987 | Synek | Jan. 23, 1951 |
| 2,662,480 | Cliborn | Dec. 15, 1953 |

FOREIGN PATENTS

| | | |
|---|---|---|
| 473,951 | Canada | May 29, 1951 |